United States Patent
Reese et al.

(10) Patent No.: US 10,875,975 B2
(45) Date of Patent: *Dec. 29, 2020

(54) METHOD TO MANUFACTURE POLYMER COMPOSITE MATERIALS WITH NANO-FILLERS FOR USE IN ADDITIVE MANUFACTURING TO IMPROVE MATERIAL PROPERTIES

(71) Applicant: Arevo, Inc., Santa Clara, CA (US)

(72) Inventors: Riley Reese, Sunnyvale, CA (US); Hemant Bheda, Saratoga, CA (US)

(73) Assignee: Arevo, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/032,969

(22) Filed: Jul. 11, 2018

(65) Prior Publication Data

US 2018/0327552 A1 Nov. 15, 2018

Related U.S. Application Data

(63) Continuation of application No. 15/865,018, filed on Jan. 8, 2018, which is a continuation of application No. 14/682,067, filed on Apr. 8, 2015, now Pat. No. 9,908,978.

(51) Int. Cl.
C08J 3/22 (2006.01)
B33Y 70/00 (2020.01)

(52) U.S. Cl.
CPC .............. *C08J 3/226* (2013.01); *B33Y 70/00* (2014.12); *C08J 2379/08* (2013.01); *C08J 2381/06* (2013.01); *C08J 2479/08* (2013.01); *C08J 2481/06* (2013.01)

(58) Field of Classification Search
CPC .................................. C08J 3/226; B33Y 70/00
See application file for complete search history.

(56) References Cited

U.S. PATENT DOCUMENTS

| | | | |
|---|---|---|---|
| 4,175,175 A | 11/1979 | Farnham et al. | |
| 4,713,426 A | 12/1987 | Harris et al. | |
| 5,070,157 A | 12/1991 | Isayev I et al. | |
| 5,147,936 A | 9/1992 | Peszkin et al. | |
| 5,342,664 A | 8/1994 | Drotloff et al. | |
| 5,747,560 A | 5/1998 | Christiani et al. | |
| 5,844,036 A | 12/1998 | Hughes et al. | |
| 5,900,207 A | 5/1999 | Danforth et al. | |
| 6,070,107 A | 5/2000 | Lombardi et al. | |
| 7,354,990 B2 | 4/2008 | Hossan et al. | |
| 8,158,217 B2 | 4/2012 | Shah et al. | |
| 8,663,542 B2 | 3/2014 | Mutsuda | |
| 8,999,453 B2 | 4/2015 | Shah et al. | |
| 9,255,003 B2 | 2/2016 | Keller et al. | |
| 9,527,242 B2 | 12/2016 | Rodgers et al. | |
| 9,745,452 B2 | 8/2017 | Hwang et al. | |
| 9,803,061 B2 | 10/2017 | Hattori et al. | |
| 9,908,978 B2 * | 3/2018 | Reese .................. | C08J 3/226 |
| 2003/0056870 A1 | 3/2003 | Comb et al. | |
| 2004/0122174 A1 | 6/2004 | Mather et al. | |
| 2006/0001190 A1 | 1/2006 | Priedeman, Jr. et al. | |
| 2006/0134419 A1 | 6/2006 | Monsheimer et al. | |
| 2007/0197739 A1 * | 8/2007 | Aneja ................. | C08L 71/10 525/437 |
| 2008/0315156 A1 | 12/2008 | Flath et al. | |
| 2009/0169825 A1 | 7/2009 | Farmer et al. | |
| 2009/0234060 A1 | 9/2009 | Haralur et al. | |
| 2009/0326152 A1 | 12/2009 | Li et al. | |
| 2010/0081731 A1 | 4/2010 | Ting | |
| 2010/0271253 A1 | 10/2010 | Shah et al. | |
| 2010/0327479 A1 | 12/2010 | Zinniel et al. | |
| 2011/0104417 A1 | 5/2011 | Wang et al. | |
| 2011/0171469 A1 | 7/2011 | Shah et al. | |
| 2011/0297892 A1 | 12/2011 | Shah et al. | |
| 2012/0070619 A1 | 3/2012 | Mikulak et al. | |
| 2012/0231225 A1 | 9/2012 | Mikulak et al. | |
| 2013/0113135 A1 | 5/2013 | Wakabayashi et al. | |
| 2013/0217838 A1 | 8/2013 | Defelice et al. | |
| 2013/0337256 A1 | 12/2013 | Farmer et al. | |
| 2014/0141166 A1 | 5/2014 | Rodgers | |
| 2014/0141168 A1 | 5/2014 | Rodgers et al. | |
| 2014/0194579 A1 | 7/2014 | Ramalingam et al. | |
| 2015/0028523 A1 | 1/2015 | Jaker et al. | |
| 2015/0051339 A1 | 2/2015 | Brunner et al. | |
| 2015/0145168 A1 | 5/2015 | Rodgers et al. | |
| 2015/0147506 A1 | 5/2015 | Korzhenko et al. | |
| 2015/0251353 A1 | 9/2015 | Rodgers et al. | |
| 2015/0252190 A1 | 9/2015 | Rodgers et al. | |

(Continued)

FOREIGN PATENT DOCUMENTS

| | | |
|---|---|---|
| EP | 2290001 B1 | 10/2017 |
| EP | 3242908 A1 | 11/2017 |

(Continued)

OTHER PUBLICATIONS

Co-pending U.S. Appl. No. 15/945,443, filed Apr. 8, 2018.

(Continued)

*Primary Examiner* — Edward J Cain
(74) *Attorney, Agent, or Firm* — Jing Wang

(57) ABSTRACT

Methods for producing 3D printing composite polymer materials for use in additive manufacturing processes are provided. The methods result in enhancing the material properties of the printing material by providing a uniform and smooth surface finish of the printing material and the nozzle extrudate for additive manufacturing processes, such as Fused Filament Fabrication. The method includes implementing impregnation techniques for combining carbon nanotubes or other nano-fillers, a polymer resin and a fiber material to produce a polymer material that can be processed into a printing material. Further, the method may include combining the carbon nanotubes or other nano-fillers and the polymer resin to form a masterbatch that may be further combined with the fiber material through an extrusion process. The method results in a printing material with enhanced material properties and smooth surface finish for the printing material and resulting nozzle extrudate for Fused Filament Fabrication.

11 Claims, 3 Drawing Sheets

(56) References Cited

U.S. PATENT DOCUMENTS

| | | |
|---|---|---|
| 2015/0259530 A1 | 9/2015 | Rodgers et al. |
| 2015/0274588 A1 | 10/2015 | Defelice et al. |
| 2016/0082641 A1 | 3/2016 | Bogucki et al. |
| 2016/0122540 A1 | 5/2016 | Brule et al. |
| 2016/0136887 A1 | 5/2016 | Guillemette et al. |
| 2016/0161872 A1 | 6/2016 | Orrock et al. |
| 2016/0251486 A1 | 9/2016 | Cernohous et al. |
| 2017/0096576 A1 | 4/2017 | Bheda et al. |
| 2017/0198104 A1 | 7/2017 | Bheda et al. |
| 2018/0142070 A1 | 5/2018 | Reese et al. |
| 2018/0201737 A1 | 7/2018 | Bheda et al. |

FOREIGN PATENT DOCUMENTS

| | | |
|---|---|---|
| WO | WO-2007035402 A2 | 3/2007 |
| WO | WO-2017062459 A1 | 4/2017 |
| WO | WO-2017126476 A1 | 7/2017 |
| WO | WO-2017126477 A1 | 7/2017 |
| WO | WO-2017149896 A1 | 9/2017 |

OTHER PUBLICATIONS

International search report and written opinion dated Feb. 6, 2017 for PCT Application No. PCT/US2016/055505.
MakeitFrom.com, "Compare PAS to PEI", Website: http:/www.makeitfrom.com/compare/Polyarysulfone-PAS/Polyethermide-PEI, Printed Jul. 20, 2017, 6 pp.
Maletzko, et al. "Polyarylsulfones", High-performance Plastics Trend Report, Kunststoffe international Oct. 2011, Cari Hanser Verlag, Munich, pp. 56-60.
Notice of allowance dated Dec. 6, 2017 for U.S. Appl. No. 14/682,067.
Office Action dated Jun. 15, 2017 for U.S. Appl. No. 14/682,067.
Office action dated Aug. 28, 2017 for U.S. Appl. No. 14/297,185.
Office Action dated Sep. 8, 2016 for U.S. Appl. No. 14/682,067.
Office action dated Dec. 14, 2017 for U.S. Appl. No. 14/297,185.
Solvay. AvaSpire®Paek—Customized high-performance polyketones. Available at https://www.solvay.com/en/markets-and-products/featured-products/avaspire.html. Accessed on Dec. 19, 2017.
Solvay. Torlon®4203L. Available at https://www.solvay.com/en/markets-and-products/products/detail.html?productId=688&productName=Torlon%C2%AE+4203L. Accessed on Dec. 19, 2017.
Solvay. Torlon®PAI. Get the Best of Both World. Available at https://www.solvay.com/en/markets-and-products/featured-products/torlon.html. Accessed on Dec. 19, 2017.
Rozanski, et al. Modification of amorphous phase of semicrystalline polymers. Polimery . 2012, vol. 57 Issue 6, p. 433-440.
Wikipedia. Polyamide-imide. Available at https://en.wikipedia.org/wiki/Polyamide-imide. Accessed on Dec. 19, 2017.
U.S. Appl. No. 14/874,963 Office Action dated Oct. 4, 2018.
U.S. Appl. No. 15/865,018 Office Action dated Jan. 25, 2019.
U.S. Appl. No. 14/874,963 Office Action dated Feb. 25, 2019.
U.S. Appl. No. 14/874,963 Office Action dated Oct. 10, 2019.
U.S. Appl. No. 15/865,018 Office Action dated Aug. 8, 2019.
U.S. Appl. No. 15/945,443 Office Action dated Nov. 25, 2019.
Non-Final Rejection in U.S. Appl. No. 15/865,018 dated Mar. 20, 2020, 10 pages.
Non-Final-Office Action in U.S. Appl. No. 15/865,018, dated Aug. 8, 2019, 5 pages.

* cited by examiner

METHOD TO MANUFACTURE POLYMER COMPOSITE MATERIALS WITH NANO-FILLERS FOR USE IN ADDITIVE MANUFACTURING TO IMPROVE MATERIAL PROPERTIES

CROSS-REFERENCE

The present application is a continuation of U.S. application Ser. No. 15/865,018, filed Jan. 8, 2018, which is a continuation of U.S. application Ser. No. 14/682,067, filed Apr. 8, 2015, now U.S. Pat. No. 9,908,978, issued Mar. 6, 2018, each of which are entirely incorporated herein by reference.

FIELD OF THE INVENTION

The present invention generally relates to methods of manufacturing polymer materials to be used in additive manufacturing processes for making 3D objects. More particularly, the present invention relates to methods of combining carbon nanotubes or other nano-fillers with fiber filled polymers to produce printing material with superior mechanical, electrical, and thermal properties for additive manufacturing.

BACKGROUND

Rapid prototyping, additive manufacturing, or 3D printing processes utilize a three-dimensional (3D) CAD file to produce a 3D object. Numerous methodologies have been described in prior art, the most common including selective-laser-sintering ("SLS"), stereo lithography ("SLA"), inkjet printing, and extrusion based 3D printing or FFF (fused filament fabrication).

Several types of low temperature thermoplastic polymers, such as ABS (acrylonitrile butadiene styrene) and PLA (polytactic acid) are used in additive manufacturing for prototyping. Higher-end engineering polymers, such as polyetheretherketone (PEEK), polyetherketoneketone (PEKK), polyphenylsulphone (PPSU), polycarbonate (PC), and polyetherimide (PEI) are used for fixtures or higher temperature applications. Fiber fillers, such as carbon, or glass fibers, have been added to polymers used for additive manufacturing to enhance the mechanical properties. Although the stiffness increases with increased fiber loading as expected, the tensile strength does not increase proportionally with the fiber loading for 3D printed parts. Testing of these 3D printed parts have demonstrated that the tensile strength for these parts are around 40% to 60% less than the tensile strength of the same parts made through injection molding or machining.

Using a specific example involving Fused Filament Fabrication, carbon fiber and glass fiber polymer filaments have a rough, uneven surface. As the fiber loading increases, the surface roughness and unevenness in filament diameter also increases. The surface roughness and aberrations result in a brittle filament, which is difficult to handle and process in a 3D printer. Moreover, filament with surface variations can cause the motor and incoming filament to stall, resulting in voids or gaps in the printed part/objects. The nozzle extrudate, material exiting the printing nozzle, also shares the same surface roughness and brittle nature of the feed filament. The extrudate boundaries created during the printing of a 3D object are the mechanically weak areas of the part. Thus, under loading, the 3D printed parts fail at these boundaries through crack propagation, delamination, or another failure mode. For achieving the best possible material properties for Fused Filament Fabrication, the polymer filament and resulting nozzle extrudate must have a uniform and smooth surface.

Therefore, there exists a need to improve the material properties of fiber filled polymer materials used for additive manufacturing.

Furthermore, there exists a need to achieve a smoother and uniform surface finish for the printing material (and nozzle extrudate for Fused Filament Fabrication) to enhance the material properties and improve the ease of handling.

SUMMARY OF THE INVENTION

An aspect of the present invention provides a method for producing a printing material, for use in additive manufacturing processes, in order to enhance the properties of the printing material and nozzle extrudate for Fused Filament Fabrication, the method comprising: combining carbon nanotubes or other nano-fillers into a neat polymer resin to form a masterbatch, using inclusion techniques; combining a fiber-filled polymer material with the masterbatch in order to produce the printing material, implementing the compounding, melt mixing, spinning (dry, wet and jet), solution processing, and/or in-situ polymerization, techniques; where the fiber-filled polymer material is combined in the masterbatch during an extrusion process extruding a printing material. The combined material may then be processed to produce feed material for a specific 3D printing method (e.g. powder for Selective Laser Sintering, filament for Fused Filament Fabrication, etc.), such that the method results in a uniform and smooth surface finish of the printing material that helps in enhancing the material properties of the printing material and nozzle extrudate for Fused Filament Fabrication.

Another aspect of the present invention provides a method for producing a printing material, for use in additive manufacturing processes, in order to enhance the properties of the printing material and nozzle extrudate for Fused Filament Fabrication, the method comprising: combining carbon nanotubes or other nano-fillers with a fiber material together into a polymer resin to form a printing material, using compounding, melt mixing, spinning (dry, wet and jet), solution processing, and/or in-situ polymerization techniques, and allowing for uniform and even distribution of the carbon nanotubes or other nano-fillers and the fiber material within the polymer resin. The combined material may then be processed to produce feed material for a specific 3D printing method (e.g. powder for Selective Laser Sintering, filament for Fused Filament Fabrication, etc.), such that the method results in a uniform and smooth surface finish of the printing material that helps in enhancing the properties of the printing material and nozzle extrudate for Fused Filament Fabrication.

Yet another aspect of the present invention provides a method for producing a printing material, for use in additive manufacturing processes, in order to enhance the properties of the printing material and nozzle extrudate for Fused Filament Fabrication, the method comprising: coating, grafting, or growing carbon nanotubes or other nano-fillers evenly on surface of a fiber material; combining of the modified fiber material within a polymer resin. The processed material may then be processed to produce feed material for a specific 3D printing method (e.g. powder for Selective Laser Sintering, filament for Fused Filament Fabrication, etc.), such that the method results in a uniform and smooth surface finish of the printing material that helps in enhancing the material properties of the printing material and nozzle extrudate for Fused Filament Fabrication.

An aspect of the present invention involves the extrusion process being performed using a twin extruder with a high ratio screw to provide a high level of shear and maximize dispersion of the carbon nanotubes or other nano-fillers and fiber material in polymer. Other dispersion techniques may involve higher screw speed, low material throughputs, and the positioning of the filler feeding.

Another aspect of the present invention involves the combining of the carbon nanotubes or other nano-fillers and the fiber-filled polymer material to maximize the wettability and dispersion of the nano-filler and the fiber material in the printing material.

In aspects, other nano-fillers include but are not limited to graphene nanoplatelets, graphite powder, PTFE powder, and the like nano-fillers. Any combination or multiple combinations of these nano-fillers may also be combined with the fiber-filled polymer material to form the printing material.

Another aspect of the present invention provides the carbon nanotubes or other nano-fillers incorporation techniques may include but are not limited to compounding, melt mixing, spinning (dry, wet and jet), solution processing, in-situ polymerization, and the like.

A further embodiment of the present invention provides the fiber filled polymer material may have carbon fibers, glass fibers, aramid fibers, and the like as fillers. The fiber material may be in the form of milled, chopped, long discontinuous, and/or continuous fibers.

An aspect of the present invention is to enhance material properties of the printing material by achieving smoother and uniform surface of the printing material used in additive manufacturing processes.

Another aspect of the present invention is to enhance material properties of nozzle extrudate for Fused Filament Fabrication by achieving smoother and uniform surface of the extrudate used to construct 3D objects through additive manufacturing processes.

Another aspect of the present invention is to use nano-particle fibers with fiber filled polymer in order to produce printing material.

A further aspect of the present invention is to use carbon nano-tubes or other nano-fillers combined with fiber filled polymer material in the presence of a neat polymer resin for producing printing material to be used for additive manufacturing processes.

Another aspect of the present invention is to use graphene nano-platelets or other nano-filler combined with fiber filled polymer material in the presence of a neat polymer resin for producing printing material to be used for additive manufacturing processes.

An aspect of the present invention is combining carbon nano-tubes or other nano-fillers with a neat polymer resin, and then with fiber filled polymer in a subsequent process. For Fused Filament Fabrication, an embodiment could involve extruding into printing material directly or compounding first and then extruding subsequently.

Yet another aspect of the present invention is to coat, graft, or grow nano-fillers onto the fibers and then combine the modified fibers with neat polymer resin. This batch is then processed to create printing material.

Yet another aspect of the present invention is to graft the polymer fibers with carbon nanotubes or other nano-fillers and then combine the grafted fibers with neat polymer resin. This batch is then processed to create printing material.

DETAILED DESCRIPTION OF THE EMBODIMENTS

In the following detailed description of embodiments of the invention, numerous specific details are set forth in order to provide a thorough understanding of the embodiments of the invention. However, it will be obvious to a person skilled in art that the embodiments of the invention may be practiced with or without these specific details. In other instances well known methods, procedures and components have not been described in details so as not to unnecessarily obscure aspects of the embodiments of the invention.

Furthermore, it will be clear that the invention is not limited to these embodiments only. Numerous modifications, changes, variations, substitutions and equivalents will be apparent to those skilled in the art, without parting from the spirit and scope of the invention.

The present invention relates to a method of producing a printing material, to be used in additive manufacturing processes, by using nano-sized particles, such as carbon nano-tubes. The present invention further aims to result in enhancing the material properties of the printing material and nozzle extrudate for additive manufacturing processes, such as Fused Filament Fabrication. For achieving the highest possible material properties in the printing materials and nozzle extrudate for Fused Filament Fabrication, smooth and uniform surface of the printing material plays a crucial role. Therefore, the present invention relates to use of nano sized particles, such as carbon nanotubes, with fiber filled polymer, in order to achieve smooth and uniform surface and in-turn enhance the material properties of the printing material and nozzle extrudate for Fused Filament Fabrication, and thereby enhancing the material properties of 3D printed objects.

For 3D printing or additive manufacturing processes, the wettability and surface finish of fibers are of particular importance due to many surface interfaces present in a 3D printed object. Rough contacting surfaces result in defects, voids, or asperities. These asymmetrical features act as stress concentrators in the part under load, causing premature failure. In order to maximize the surface adhesion between individual extrudate sections and layers, carbon nanotubes or other nano-filters are added to fiber filled printing materials. To maximize the dispersion and wettability of carbon nanotubes or other nano-fillers and fiber material in 3D printing material, the present invention provides efficient methods of combining carbon nanotubes or other nano-fillers with fiber filled polymer material.

Figure 1:
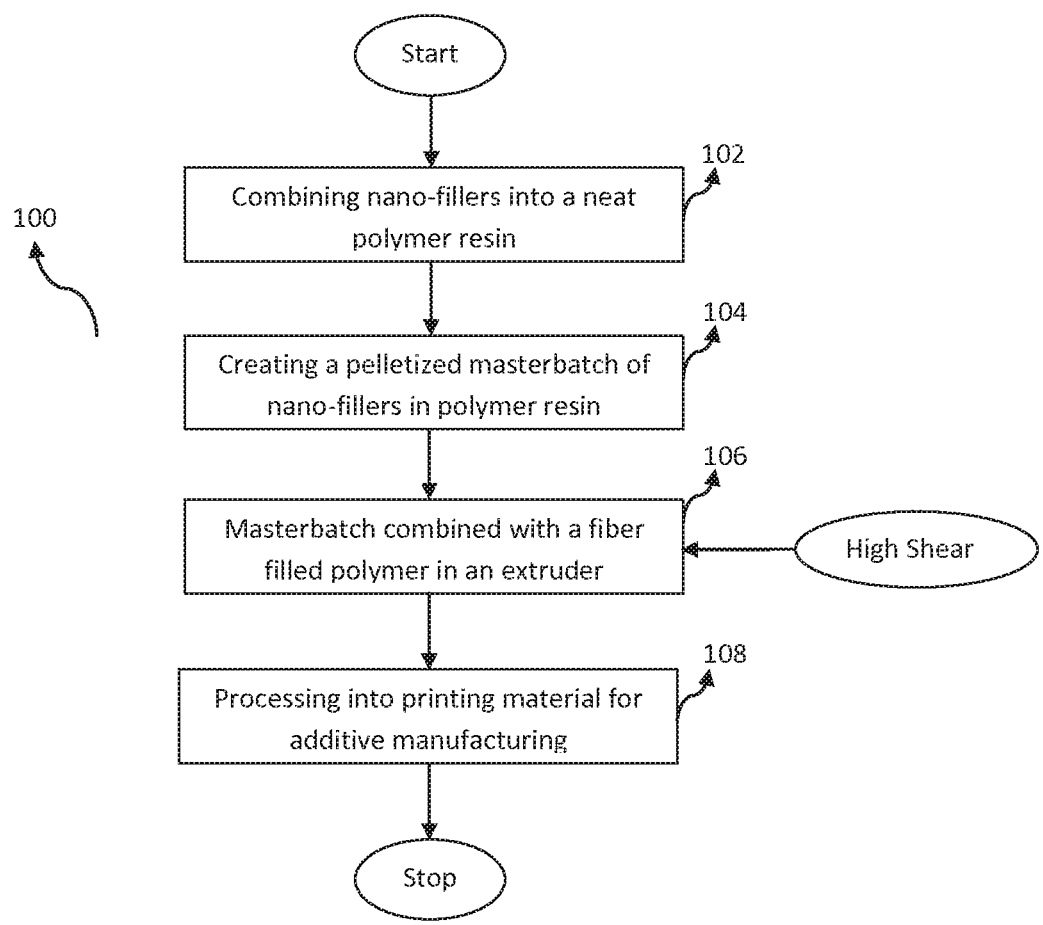
FIG. 1 depicts a flowchart showing a method, such as a method 100, for producing a printing material for use in additive manufacturing processes, in accordance with an embodiment of the present invention.

FIG. 1 depicts a flowchart showing a method for producing a printing material for use in an additive manufacturing process, in accordance with an embodiment of the present invention. The technology used in the present invention for producing 3D printing material includes and is not limited to extrusion processes. Combining carbon nanotubes or other nano-fillers with resin involves compounding, melt mixing, spinning (dry, wet and jet), solution processing, and in-situ polymerization. This process changes the physical, thermal, electrical or aesthetic characteristics of the plastic. The final product is called a compound or composite.

FIG. 1 shows a flowchart depicting a method 100 for producing a 3D printing polymer material with enhanced material properties. As mentioned in the background, carbon fiber and glass fiber printing materials have a rough, uneven surface that further results in brittle material, which is difficult to handle and process in a 3D printer. Therefore, enhanced material properties of the printing material are a requirement in 3D printing. Hence, embodiments of the present invention provide for use of carbon nanotubes or other nano-fillers with the fiber-filled polymers that results in a smooth surface finish and consequently, in enhanced material properties. According to FIG. 1, at steps 102-104, carbon nanotubes (CNT) or other nano-fillers may be combined with a neat (unfilled) polymer resin to form a masterbatch. As mentioned above, combining processes may include compounding, melt mixing, spinning (dry, wet and jet), solution processing, in-situ polymerization, and like processes. At step 104, a pelletized masterbatch of carbon nanotubes or other nano-fillers in polymer resin is formed.

After the masterbatch has been created, the masterbatch may be further combined with a fiber filled polymer material, at step 106. Consequently, a 3D printing polymer material is produced using carbon nanotubes or other nano-fillers, at step 108. In an embodiment of the present invention, the masterbatch may be first combined with the fiber filled polymer material to form a printing material that may be further processed into polymer material. In a specific embodiment, the masterbatch may be combined with the fiber filled polymer material during an extrusion process, resultantly drawing out polymer filament for Fused Filament Fabrication (referred to as "FFF") simultaneously.

The method 100 results in a uniform and smooth surface finish of the 3D printing material that helps in enhancing the material properties of the printing material.

Figure 2:
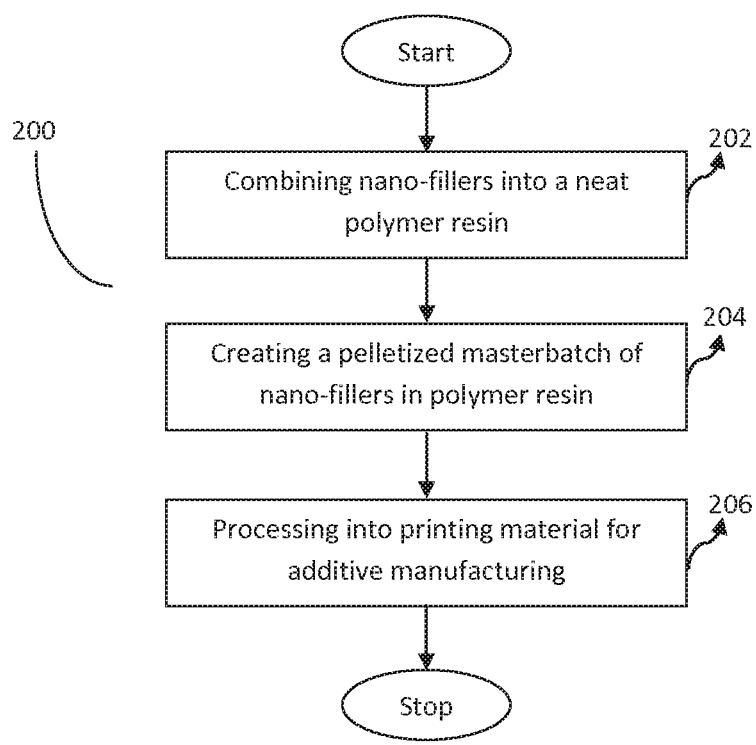
FIG. 2 shows a flowchart depicting a method 200 for producing a printing material for use in additive manufacturing processes, in accordance with an embodiment of the present invention.

FIG. 2 shows a flowchart depicting a method 200 for producing a printing material for use in an additive manufacturing process, in accordance with an embodiment of the present invention. According to FIG. 2, the carbon nanotubes or other nano-fillers may be combined with a fiber together within a polymer resin, at step 202. Thereafter, at step 204, a pelletized master batch of carbon nanotubes or other nano-fillers and fiber in the polymer resin is formed. Consequently, a 3D printing polymer material for additive manufacturing processes, such as fused filament fabrication, may be obtained, at step 206. The method 200 allows for uniform and even distribution of carbon nanotubes or other nano-fillers and fiber within the polymer matrix. In an embodiment, the combined printing material may be combined in a twin extruder drawing out a polymer filament for use in 3D printing processes.

Figure 3:
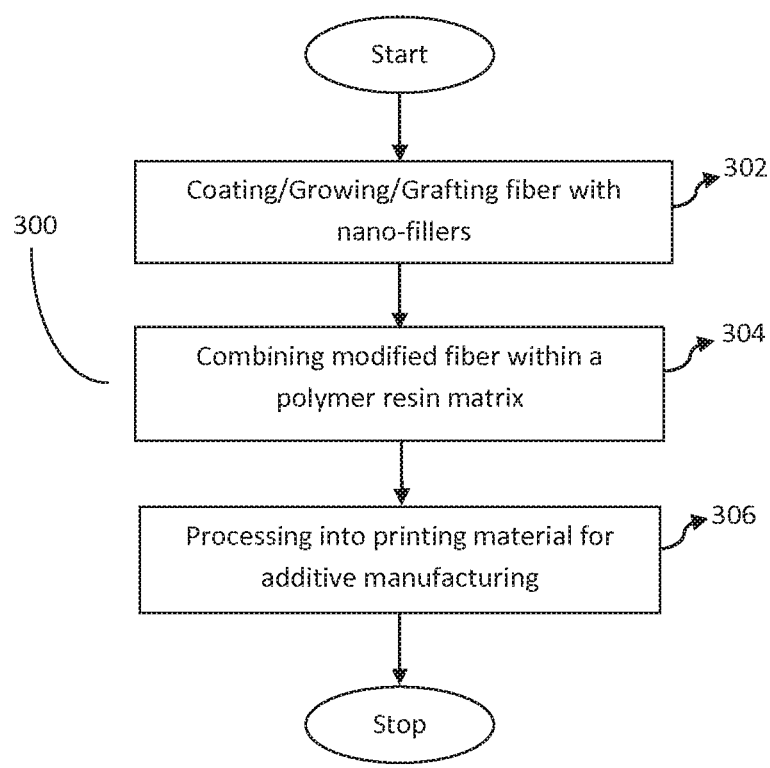
FIG. 3 shows a flowchart depicting a method 300 for producing a printing material for use in additive manufacturing processes, in accordance with an embodiment of the present invention.

FIG. 3 shows a flowchart depicting a method 300 for producing a printing material for use in additive manufacturing process, in accordance with an embodiment of the present invention. According to FIG. 3, at step 302, carbon nanotubes or other nano-fillers may be directly applied through grafting or growing on the fiber surface or coated evenly on the fiber surface prior to combining with a polymer resin. Thereafter, at step 304, the modified fiber material may be combined with a polymer resin, thereby producing a 3D printing material. Consequently, at step 306, the 3D printing material may be processed to form a 3D printing material further to be used in additive manufacturing processes.

In an embodiment of the present invention for an extrusion process, the masterbatch may be combined with the fiber filled polymer material in an extruder, such as a twin extruder, and preferably under the highest shear possible to maximize dispersion.

In an embodiment of the present invention, a mixture of carbon nanotubes and graphene nanoplatelets may also be combined with the fiber material and the polymer resin to form the 3D printing material. This may help in optimizing the mechanical strength, thermal conductivity, electrical conductivity, and ease of handling for 3D printing material.

In an embodiment of the present invention, the fiber filled polymer material may be used in the form of pellets for extrusion, to form the printing material.

In an embodiment, the polymer resin may have carbon fibers, glass fibers, aramid fibers, and the like to form fiber filled polymer. The fiber material may be in the form of milled, chopped, long discontinuous, and/or continuous fibers.

In another embodiment of the present invention, the polymer resin may be a thermosetting polymer resin, or may be a polyaryletherketone (PAEK), polyethertherketone (PEEK), polyetherketoneketone (PEKK), polyethylene (PE), polyetherimide (PEI commonly known as Ultem), polyethersulfone (PES), polysulfone (PSU commonly known as Udel), potyphenylsulfone (PPSU commonly known as Radel), polyphenytene oxides (PPOs), acrylonitrile butadiene styrene (ABS), polylactic acid (PLA), polyglycolic acid (PGA), polyamide-imide (PAI commonly known as Torlon), polystyrene (PS), polyamide (PA), polybutylene terephthalate (PBT), poly(p-phenylene sulfide) (PPS), polyethersulfone (PESU), polyphenylene ether (commonly known as PrimoSpire), and polycarbonate (PC) and the like.

In another embodiment of the present invention, the polymer resins may be combined together to improve the printability and fiber/nano-filler wettability. One such example is a blend of polyethertherketone (PEEK) with polyphenylsulfone (PPSU) with a composition in the range of 60:40 to 90:10 respectively.

In an embodiment of the present invention, the amount of fiber or carbon nanotube or other nano-filler material in the polymer resins may range from 5% up to 60%. The following examples of compositions of polyetherimide (PEI) and polyethertherketone (PEEK) resins: 30% CNT loading, 15% CNT and 15% CF, 10% CNT and 10% CF (Carbon Fiber). A blend of 15% CNT and 15% graphene may also be combined in the above thermoplastic resins. In a preferred embodiment one may change the loading of CNT and graphene from as low as 1% CNT or graphene up to as high as 40% graphene or CNT.

Advantageously, embodiments of the present invention provide a method to produce a 3D printing material by using carbon nanotubes or other nano-fillers. Carbon nanotubes have been shown to provide a smoother, more uniform material surface through the present invention. This smooth, uniform surface has provided decreased nozzle pressure during printing, improved ease of handling, potentially better material properties, and potentially improved z-layer adhesion (due to the higher surface area contact from smoother extrudate surfaces). Furthermore, with its three dimensional structure, carbon nanotubes may be more likely to be aligned through the printing process as compared to Graphene nanoplatelets or other nano-fillers.

Further, a smooth uniform extrudate surface for Fused Filament Fabrication is achieved which enables achievement of high possible material properties. Also, the surface roughness and diameter fluctuations are reduced when adding carbon nanotubes with carbon fiber as compared to only carbon fiber.

Further advantages of the embodiments of the present invention are methods herein including a polymer material including a blend of carbon nanotubes or other nano-fillers and fibers which provide a smoother, more uniform surface, a more flexible, easier to handle printing material compared to a fiber-filled printing material. Also, smoother and more uniform extrudate for Fused Filament Fabrication may be developed as compared to a fiber-filled extrudate. Enhanced material properties compared to fiber-filled parts may also be yielded from embodiments of the present invention.

Embodiments of the present invention are suitable for additive manufacturing processes, such as fused filament fabrication (Fused Filament Fabrication), selective laser sintering (Selective Laser Sintering), droplet based, jetting methods and the like.

What is claimed is:

1. A printing material for use in additive manufacturing, comprising:
   at least one un-functionalized nano-filler, a polymer material and one or more fibers,
   wherein said polymer material comprises at least one polymer selected from the group consisting of a thermosetting polymer, a polyaryletherketone (PAEK), polyethylene (PE), polyetherimide (PEI), polysulfone (PSU), polyphenylene oxides (PPOs), acrylonitrile butadiene styrene (ABS), polylactic acid (PLA), polyglycolic acid (PGA), polyamide-imide (PAI), polystyrene (PS), polyamide (PA), polybutylene terephthalate (PBT), poly(p-phenylene sulfide) (PPS), polyphenylene ether, and polycarbonate (PC),
   wherein said polymer material comprises a polymer mixture, wherein said polymer mixture comprises a first polymer and a second polymer different than said first polymer, wherein said first polymer is the thermosetting polymer and said second polymer is a thermoplastic polymer, and
   wherein said printing material comprises 1% to 10% of said at least one un-functionalized nano-filler.

2. The printing material of claim 1, wherein said PAEK is polyethertherketone (PEEK) or polyetherketoneketone (PEKK).

3. The printing material of claim 1, wherein said PSU comprises one or more members selected from the group consisting of polyethersulfone (PES), polyphenylsulfone (PPSU), and polyethersulfone (PESU).

4. The printing material of claim 1, wherein said at least one un-functionalized nano-filler comprises one or more members selected from the group consisting of carbon nanotube, graphene nanoplatelet, graphite powder, and polytetrafluoroethylene powder.

5. The printing material of claim 1, wherein said one or more fibers is selected from the group consisting of carbon fiber, aramid fiber, and glass fiber.

6. The printing material of claim 1, wherein said one or more fibers is a continuous fiber.

7. The printing material of claim 1, wherein said one or more fibers is a chopped fiber.

8. The printing material of claim 1, wherein said printing material comprises from 1% to 5% of said at least one un-functionalized nano-filler.

9. The printing material of claim 1, wherein said second polymer is polyamide-imide (PAI).

10. The printing material of claim 1, wherein a weight ratio of said first polymer to said second polymer is greater than or equal to 3:2.

11. The printing material of claim 10, wherein said weight ratio is from about 3:2 to about 9:1.

* * * * *